United States Patent [19]

Petersson

[11] 4,338,055
[45] Jul. 6, 1982

[54] APPARATUS FOR HANDLING PALLETIZED GOODS STACKED IN TIERS

[75] Inventor: Tomas Petersson, Helsingborg, Sweden

[73] Assignee: Frigoscandia AB, Sweden

[21] Appl. No.: 160,710

[22] Filed: Jun. 18, 1980

[30] Foreign Application Priority Data

Jun. 20, 1979 [SE] Sweden ............................ 7905450

[51] Int. Cl.$^3$ ............................................. B65G 57/28
[52] U.S. Cl. ...................................... 414/114; 53/157;
414/28; 414/42; 414/330; 414/778
[58] Field of Search ................... 414/28, 38, 42, 60, 414/97, 112, 114, 115, 330, 754, 778, 783; 53/157; 29/239; 198/458

[56] References Cited

U.S. PATENT DOCUMENTS

| | | | |
|---|---|---|---|
| 3,317,060 | 5/1967 | Youngblood | 414/783 |
| 3,353,689 | 11/1967 | Dankelmeier et al. | 414/114 |
| 3,393,811 | 7/1968 | Dankelmeier et al. | 414/114 |
| 3,447,227 | 6/1969 | Wollam | 414/330 X |
| 3,955,686 | 5/1976 | Kumagai | 271/3.1 X |
| 3,967,739 | 7/1976 | Kumagai | 271/3.1 X |
| 4,009,789 | 3/1977 | Runyan et al. | 414/783 |
| 4,037,734 | 7/1977 | Erdman | 414/330 |
| 4,051,958 | 10/1977 | Richardson et al. | 414/112 |

Primary Examiner—Leslie J. Paperner
Attorney, Agent, or Firm—Karl W. Flocks; A. Fred Starobin

[57] ABSTRACT

An apparatus for handling palletized goods stacked in tiers consists of a pivoted cradle having two substantially perpendicular supports for the goods, one of said supports normally constituting a horizontal loading plane and the other a vertical supporting plane, said planes being adapted alternatingly to support the goods due to the pivoting movement of the cradle. According to the invention the supporting plane is composed of a plurality of carriages which are movable towards and away from the loading plane in such a way that the various tiers are separable from each other when supported by the supporting plane formed of the carriages.

8 Claims, 10 Drawing Figures

APPARATUS FOR HANDLING PALLETIZED GOODS STACKED IN TIERS

The present invention relates to an apparatus for handling palletized goods and the like stacked in tiers, said apparatus consisting of a pivoted cradle having two substantially perpendicular supports for the goods, one of said supports normally constituting a horizontal loading plane and the other a vertical supporting plane, said planes being adapted alternatingly to support the goods due to the pivoting movement of the cradle. Characteristic of the apparatus of the invention is that the supporting plane is composed of a plurality of parts in the form of carriages which are movable towards and away from the loading plane in such a way that the various tiers are separable from each other when supported by the supporting plane formed of the carriages. This makes it possible to separate the tiers and provide therebetween the space required to permit interposition or removal of intermediate freezer plates instead of having to lift away each tier of e.g. cartons from a pallet for this purpose. The apparatus of the invention may of course also be used in other connections where it is desired to utilize such separation of the tiers.

The invention will be desired more fully hereinafter with reference to the accompanying drawings which illustrate a preferred embodiment of the apparatus chosen by way of example, said apparatus being referred to below as the tier separator.

Figure 1:
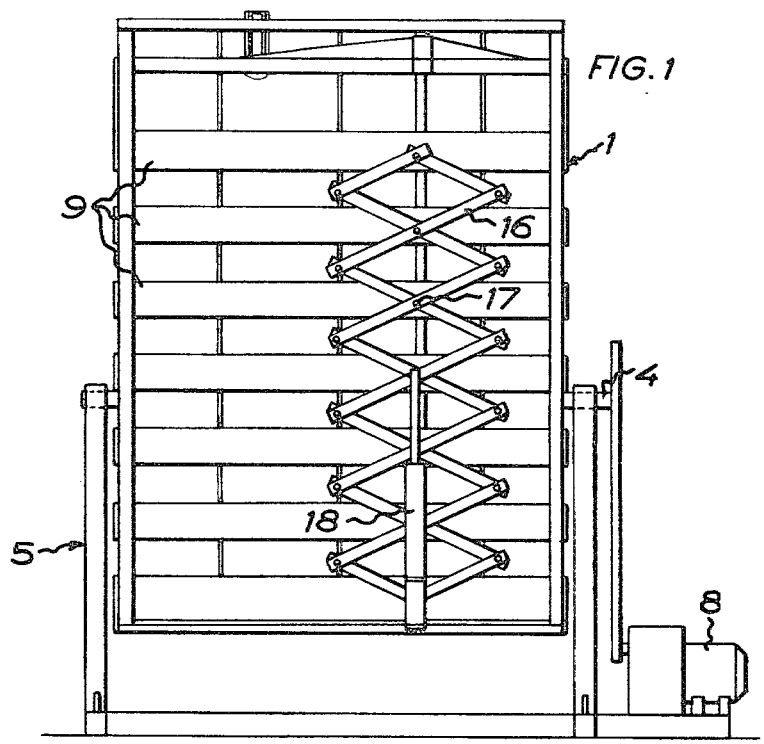
FIG. 1 is a back view of the tier separator in vertical position.
Figure 2:
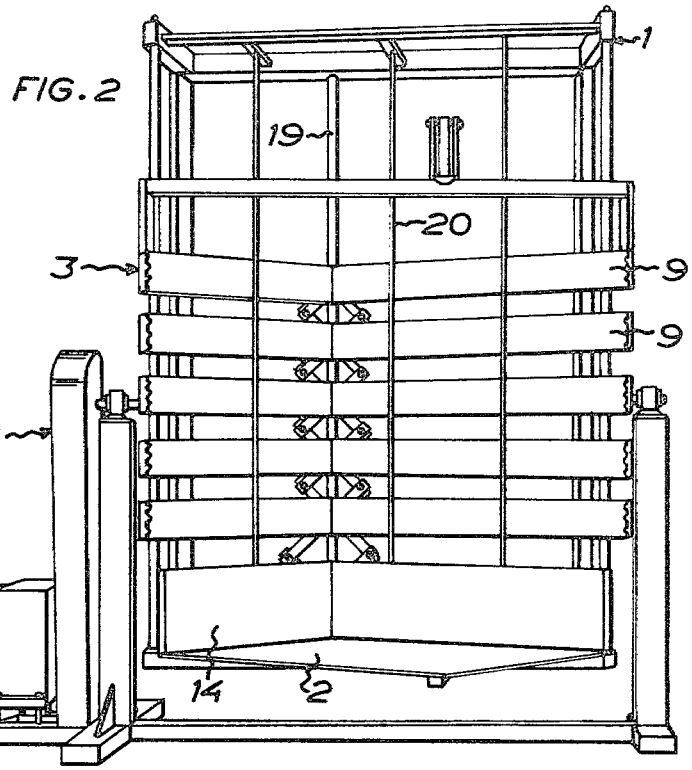
FIG. 2 is a perspective front view of the tier separator likewise in vertical position.
Figure 3:
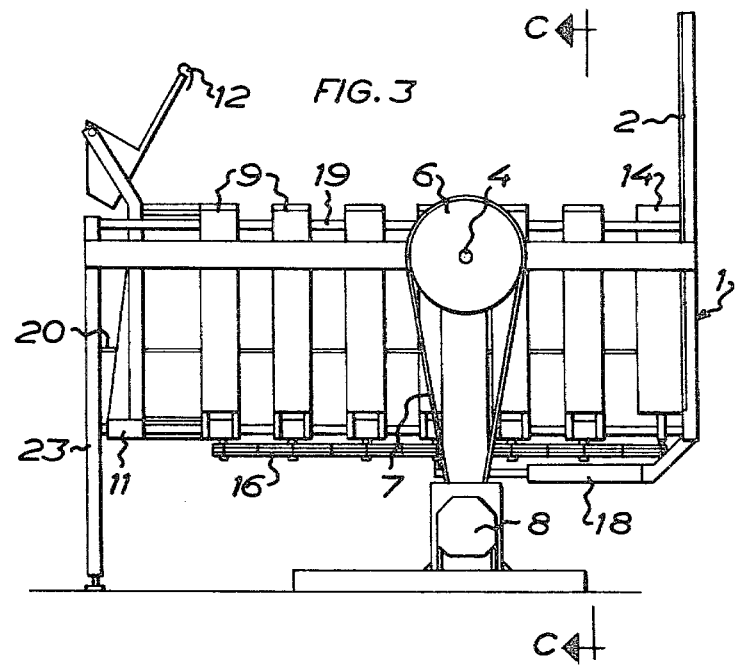
FIG. 3 is a side view of the tier separator in horizontal position.
Figure 4:
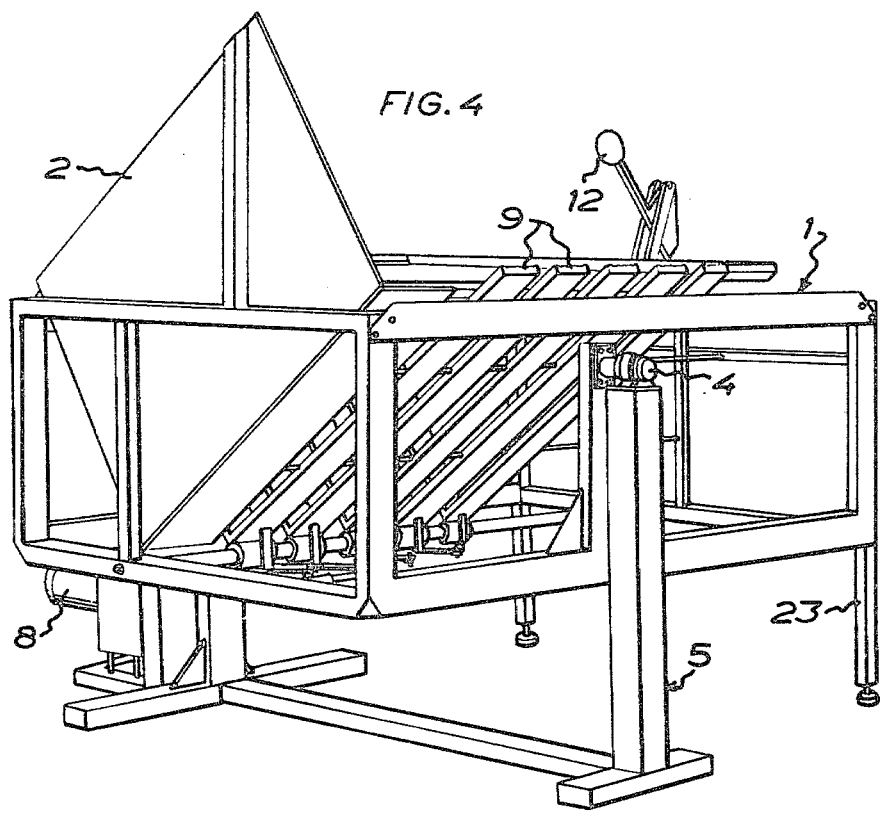
FIG. 4 is a perspective view of the tier separator likewise in horizontal position, but seen from the other side.
Figure 5:
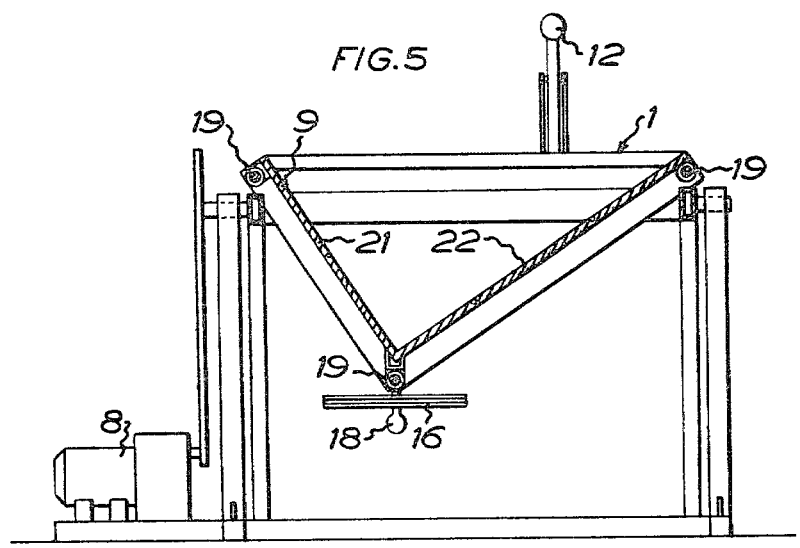
FIG. 5 is a cross-section of the tier separator taken on line C—C in FIG. 3.

Referring now to the drawings, 1 designates a pivotally mounted cradle having two supports 2 and 3, which are perpendicular to each other, for the goods, one of said supports normally constituting a horizontal loading plane 2 and the other a vertical supporting plane 3, said planes 2 and 3 being adapted alternatingly to support the goods due to the pivoting movement of the cradle 1.

According to the illustrated embodiment the cradle 1 is pivotally mounted in a stand 5 by means of a shaft 4. The shaft 4 which, more exactly, consists of pivots, is provided with a gear wheel 6 which is connected, by means of a chain 7, to a gear motor 8 mounted in the frame 5 for the pivoting movement of the cradle 1. Of course it is possible to use other mounting means for the cradle 1. Thus, the axis of rotation of the cradle 1 may be placed low so that the cradle in vertical position will come as close as possible to the support. The cradle 1 need not necessarily be provided with a shaft for its rotation but may be provided with rockers or the like for the pivoting movement.

Figure 6:
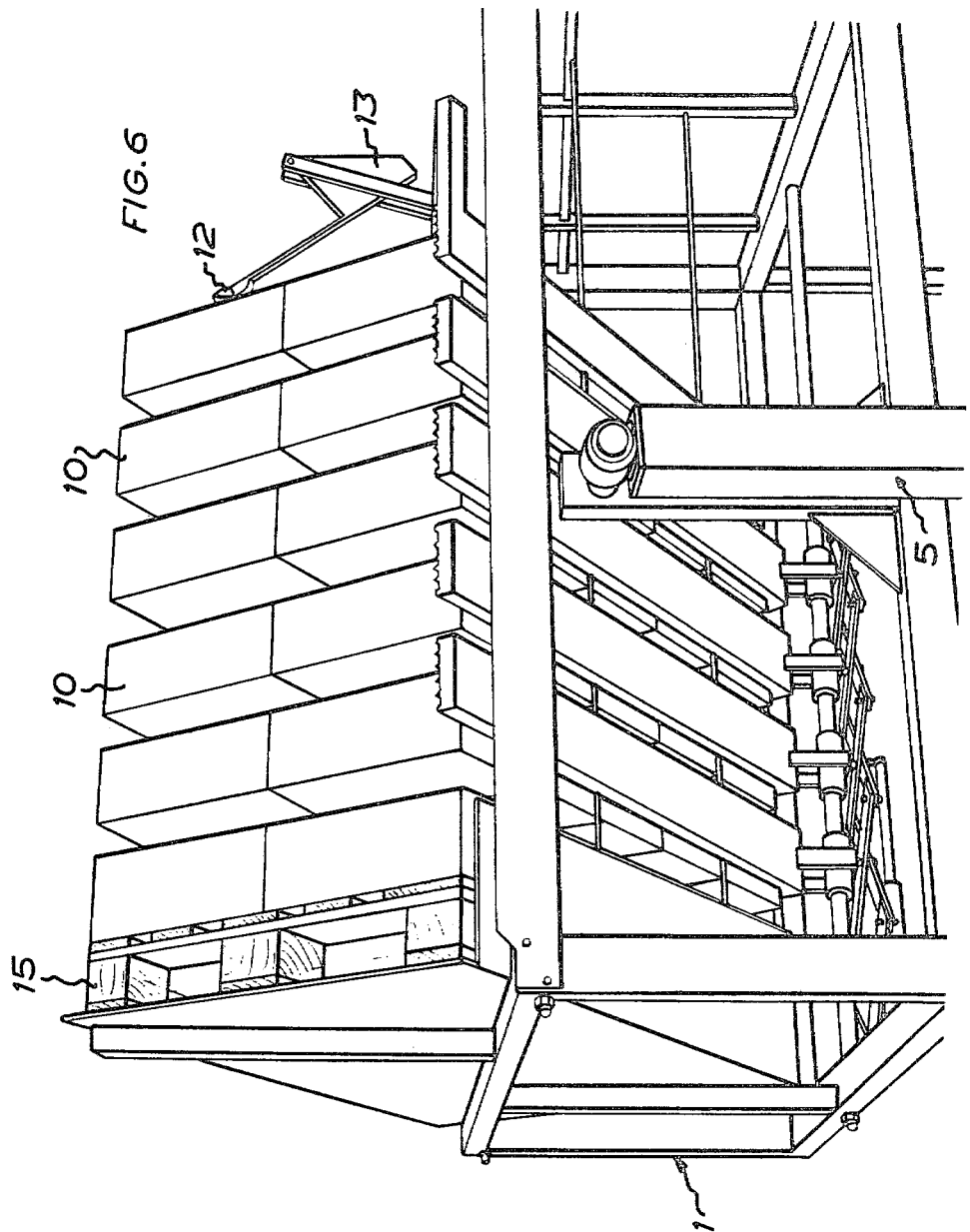
FIG. 6 shows the tier separator according to FIG. 4 with tiers comprising cartons which have been separated.
Figure 7:
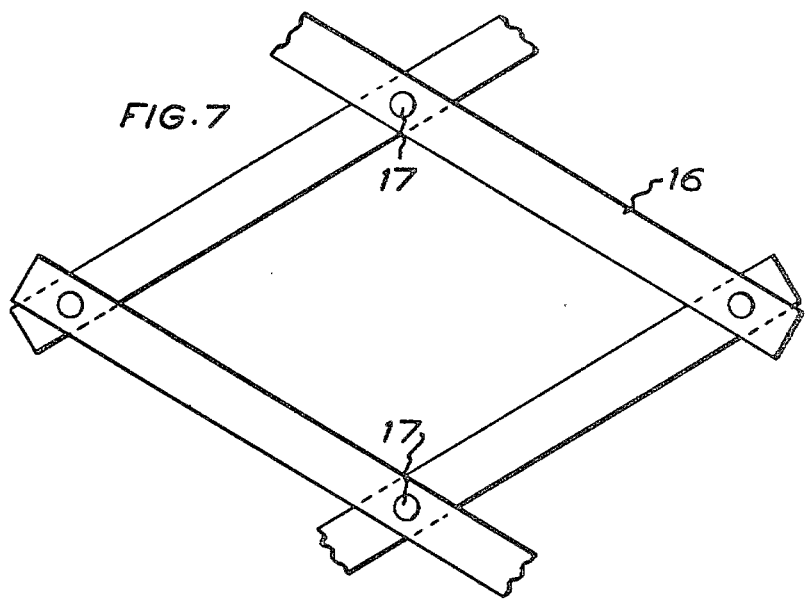
FIGS. 7 and 8 show part of a driving mechanism cooperating with the carriages, as seen in two relatively perpendicular directions.
Figure 8:
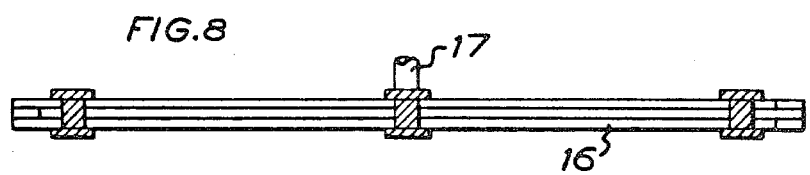

According to the invention the supporting plane 3 is composed of a plurality of parts in the form of carriages 9 which are movable towards and away from the loading plane 2 in such a way that the various tiers 10 which, according to FIG. 6, comprise cartons, are separable from each other when supported by the supporting plane 3 formed of the carriages 9.

A frame 11 is connected with the outermost carriage 9, as counted from the loading plane 2. Hingedly mounted in the frame 11 is a cover 12. The cover 12, which in the embodiment shown is subjected to the action of a counterweight 13, is designed to support, in the horizontal position of the cradle 1, the cartons 10 of the uppermost tier to prevent them from falling.

The loading plane 2 which is fixed to the cradle 1 and may consist of a roller conveyor or a ball table, is provided with a fixed support 14 for the pallet 15. This support 14 is at least generally of the same shape as the carriages 9.

It is of the utmost importance for the function of the tier separator that the displacing movement imparted to the carriages 9 should be such that the relative distance between the carriages 9 is always the same. Thus, those carriages 9 which are remote from the loading plane 2 must move over a substantially longer distance than the carriages 9 near the loading plane 2. The sixth carriage 9 must, for instance, move over a distance which is six times longer than the distance of the first carriage 9. The number of carriages 9 may of course vary for different embodiments.

The carriages 9 cooperate with a drive mechanism which automatically imparts various movements to the carriages 9. The drive mechanism might be made up of ropes. According to the preferred embodiment shown the mechanism consists of a shear mechanism 16 the junctions 17 of which cooperate with the carriages 9. The shear mechanism 16, which at its lowermost junction 17 is secured to the carriage 1, is of the so-called lazy-tongs type.

A hydraulic piston 18 acts upon the shear mechanism 16 in one of the junctions 17 for driving the carriages 9. Other driving means may of course also be used. According to the drawings the carriages 9 cooperate with a single shear mechanism 16 but it is obvious that two or more shear mechanisms 16 may be used.

The carriages are adapted for displacement along common guides 19 which are secured in the cradle 1 and are three in number in the embodiment shown.

Figure 9:
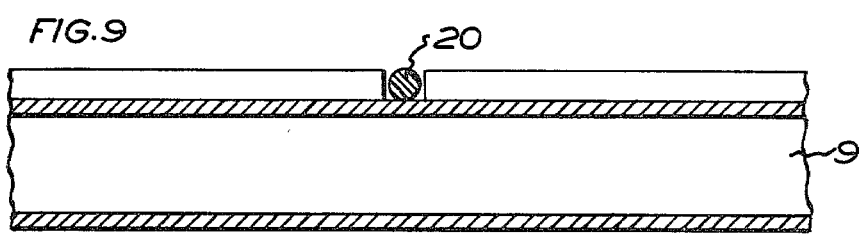
FIGS. 9 and 10 show two relatively perpendicular cross-sections of a carriage with associated supporting bar for the freezer plates placed between the tiers.
Figure 10:
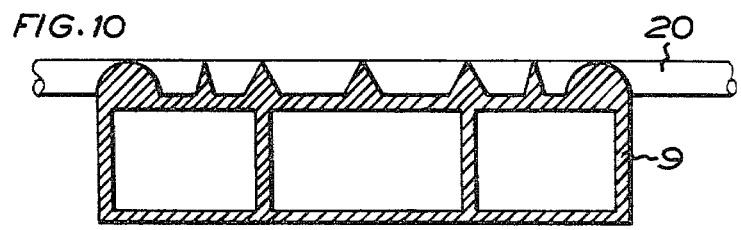

Bars 20 extending in parallel with the guides 19 are situated in the supporting plane of the carriages 9, as appears from FIGS. 9 and 10. These bars 20 are designed to support the goods, which may consist of intermediate freezer plates, situated between the carriages 9.

According to the embodiment shown the supporting planes of the carriages 9 consist of two legs 21 and 22 directed at right angles to each other, one of which, preferably the long leg 22, making 30°–45° with the axis of rotation 4 or the like of the cradle 1. According to a simple embodiment the supporting plane may be plane. In cross-section it may also be of generally semicircular shape when the carriages are intended to separate round goods.

One or more supporting legs 23 secured to the cradle 1 are designed to support, together with the stand 5, the cradle 1 in its horizontal position.

Limit switches are mounted, on one hand, in the upper part of the cradle 1, where it is activated by the frame 11 of the cover 12 upon full separation of the carriages 9 and, on the other hand, on the cradle 1 where it is activated by the frame 11 of the cover 12 when the carriages 9 are completely pushed together and, finally, on the stand 5, where it is activated by the shaft 4 to stop the cradle in horizontal or vertical position.

The operation required for placing intermediate freezer plates between tiers of cartons on palletized goods will be described briefly below.

In the initial position the cradle 1 takes a vertical position. The total height of the palletized goods is measured by causing the goods to pass through a height meter. The measured height determines how the carriages 9 shall be oriented. The adjustment to the appropriate height takes place by displacement of the carriages 9 on the guides 19.

The palletized goods are placed on the loading plane 2 and the cradle 1 is turned to horizontal position. Since the carriages 9 consist of the legs 21 and 22 and the supporting surfaces of the carriages 9 are formed as sliding surfaces, the cartons 10 slide down towards the apex of the sides of the angle. The tier is thereby stabilized at the same time as unevenly stacked palletized goods will become entirely level.

During the movement of the cradle 1 into horizontal position the cover 12 has turned about the frame 11, whereby it supports the cartons 10 of the uppermost tier and prevents them from falling.

The carriages 9 are caused to slide apart on the guides 19 by means of the hydraulic piston 18 and the shear mechanism 16. The freezer plates are now placed in the spaces formed between the cartons tiers 10, while the freezer plates are supported by the bars 20. After that the carriages are pushed together by means of the drive mechanism including the hydraulic piston 18. Finally the carriage 1 is raised by means of the motor 8 to its vertical position in which it is locked. During this movement the cover 12 has turned about the frame so that it now is freed from the uppermost carton tier.

The palletized goods have thus been provided with intermediate freezer plates and are ready for transport away from the tier separator. After the transport the tier separator is ready for another working cycle according to the above description.

For the removal of intermediate freezer plates the operations take place in principle entirely according to the above described process.

The invention is not limited to that described above and shown in the drawings but may be modified within the scope of the appended claims.

What I claim and desire to secure by Letters Patent is:

1. Apparatus for handling palletized goods and the like stacked in tiers, said apparatus consisting of a pivoted cradle (1) having two supports (2, 3) for the goods substantially perpendicular to each other, one of said supports normally constituting a horizontal loading plane (2) and the other a vertical supporting plane (3), said planes being adapted alternatingly to support the goods due to the pivoting movement of said cradle (1), characterized in that said supporting plane (3) is composed of a plurality of parts in the form of carriages (9) which are movable towards and away from said loading plane (2) in such a way that the various tiers (10) are separable from each other when supported by the supporting plane formed of the carriages (9), said carriages (9) cooperating with a drive mechanism (16–18) which is adapted to impart to said carriages (9) such a displacing movement that the relative distance between said carriages (9) is always the same, the supporting plane of said carriages (9) comprising two legs (21, 22) directed at right angles to each other, one (22) of which makes 30°–45° with the axis of rotation (4) or the like of said cradle (1).

2. Apparatus as claimed in claim 1, wherein the outermost carriage (9) as counted from the loading plane (2) is connected to a frame (11) for a cover (12) hingedly mounted thereto for the stacked goods.

3. Apparatus as claimed in claim 1 or 2, wherein the loading plane (2) is provided with a fixed support (14) for the pallet (15), said support (14) being of at least generally the same shape as the carriages (9).

4. Apparatus as claimed in claim 1, wherein the drive mechanism (16–18) includes a shear mechanism (16) the junctions (17) of which cooperate with the carriages (9).

5. Apparatus as claimed in claim 4, wherein the shear mechanism (16) is acted upon by a hydraulic piston (18) or the like for driving the carriages (9).

6. Apparatus as claimed in claims 1, 2, 4 or 5, wherein the carriages (9) are adapted to be displaceable along common guides (19) secured in the cradle (1).

7. Apparatus as claimed in claim 6, wherein bars (20) extending in parallel with the guides (19) are arranged in the supporting plane of the carriages (9) to support goods situated between the carriages (9).

8. Apparatus as claimed in claims 1, 2, 4, 5 or 7, wherein the supporting plane of the carriages (9) is generally semicircular in cross-section.

* * * * *